United States Patent [19]

Matsuda et al.

[11] Patent Number: 5,404,302
[45] Date of Patent: Apr. 4, 1995

[54] TRACTION CONTROL METHOD FOR VEHICLE

[75] Inventors: Shohei Matsuda; Toshio Yahagi; Shinichi Inagawa; Yoshihiro Urai, all of Wako, Japan

[73] Assignee: Honda Giken Kogyo Kabushiki Kaisha, Tokyo, Japan

[21] Appl. No.: 904,063

[22] Filed: Jun. 26, 1992

[30] Foreign Application Priority Data

Jul. 2, 1991 [JP] Japan .................. 3-161839
Apr. 21, 1992 [JP] Japan .................. 4-100116

[51] Int. Cl.⁶ .............................................. B60T 8/32
[52] U.S. Cl. .................. 364/426.02; 364/426.01; 364/426.03; 180/197; 303/100; 303/103; 303/95
[58] Field of Search .......... 364/426.01, 426.02, 364/426.03; 180/197; 303/93, 94, 95, 96, 97, 98, 100, 102, 103, 109

[56] References Cited

U.S. PATENT DOCUMENTS

| | | | |
|---|---|---|---|
| 4,939,656 | 7/1990 | Hoashi et al. | 364/426.02 |
| 4,955,448 | 9/1990 | Ise et al. | 180/197 |
| 4,962,824 | 10/1990 | Hagiya et al. | 180/197 |
| 4,971,164 | 11/1990 | Fujita et al. | 180/197 |
| 5,070,461 | 12/1991 | Nobumoto et al. | 364/426.03 |
| 5,169,213 | 12/1992 | Matsuda et al. | 303/113.2 |
| 5,181,174 | 1/1993 | Matsuda et al. | 364/426.02 |
| 5,241,474 | 8/1993 | Matsuda et al. | 364/426.03 |
| 5,265,694 | 11/1993 | Yamashita | 180/197 |
| 5,295,738 | 3/1994 | Matsuura et al. | 303/100 |

FOREIGN PATENT DOCUMENTS

| | | |
|---|---|---|
| 0166178 | 1/1986 | European Pat. Off. . |
| 3818511 | 12/1988 | Germany . |
| 3916990 | 5/1989 | Germany . |
| 3904572 | 8/1989 | Germany . |
| 3905855 | 9/1989 | Germany . |

Primary Examiner—Gary Chin
Assistant Examiner—Susan Wieland
Attorney, Agent, or Firm—Armstrong, Westerman, Hattori, McLeland & Naughton

[57] ABSTRACT

A traction control method for a vehicle, comprising the steps of: judging an excessive slipping state of a plurality of driving wheels by taking into account, as at least one judgment requirement, whether or not a driving-wheel speed exceeds a braking-force controlling target wheel speed determined by taking into account a predetermined slip rate of a vehicle speed, and controlling a braking force for the driving wheels in accordance with the result of the judgment, wherein the intensity of a slipping tendency for every one of the driving wheels is determined on the basis of a judgment value which is set larger than the vehicle speed and smaller than the braking-force controlling target wheel speed, and the smaller the number of the driving wheels determined to have a large slipping tendency, the more the braking-force controlling target wheel speed is increased. This prevents the occurrence of an excessive control of braking force, when the slipping tendency of only a part of the driving wheels is large.

9 Claims, 8 Drawing Sheets

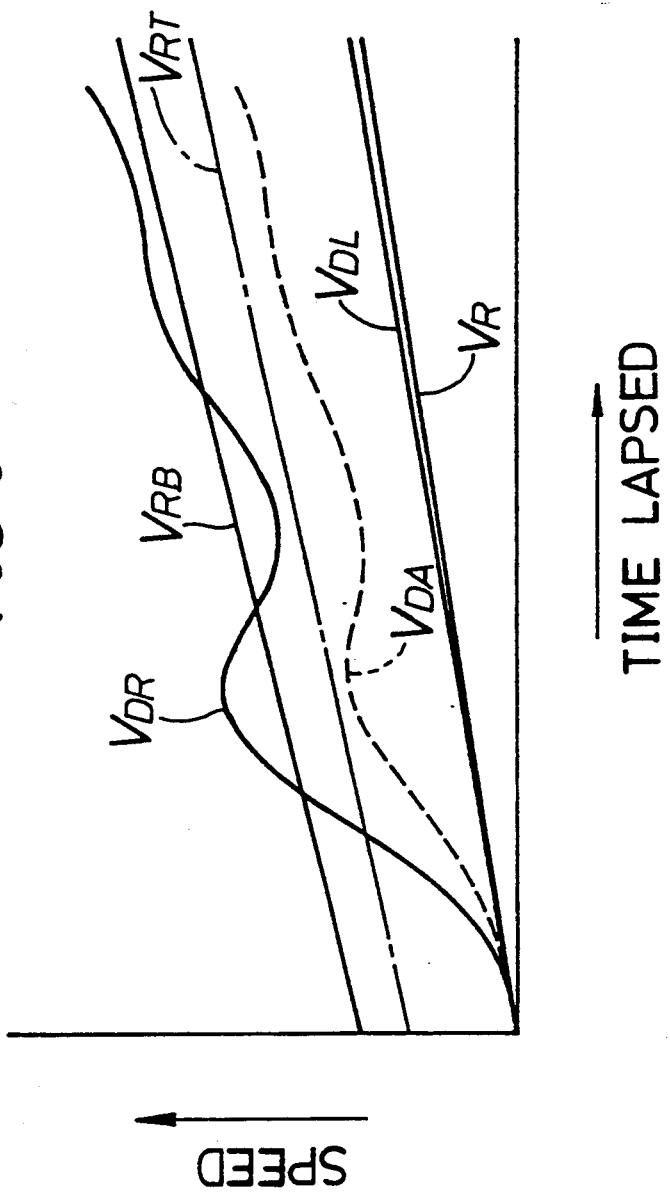

TRACTION CONTROL METHOD FOR VEHICLE

BACKGROUND OF THE INVENTION

1. Field of the Invention

This invention relates to a traction control method for a vehicle, comprising the steps of: judging an excessively slipping state of a plurality of driving wheels by taking into account, as at least one requirement for a judgement of whether or not a driving-wheel speed exceeds a braking-force controlling target wheel speed which is determined based on a vehicle speed by taking into account a predetermined slip rate, and controlling a braking force for the driving wheels in accordance with the result of this judgment.

2. Description of the Related Art

Methods in which an excessive slipping state of the driving wheels is eliminated by applying a braking force to the driving wheels is conventionally already known from Japanese Patent Application Laid-Open No. 109159/91, wherein an excessive slipping state is judged for every driving wheel, and a braking force for each of the driving wheels is independently controlled, in accordance with the judgment made. There is also a known technique in which an excessive slipping state is judged on the basis of an average value between the left and right driving-wheel speeds, and excessive slipping is eliminated by conducting, in, combination, a control of torque applied to the driving wheels in accordance with the result of judgment, and an independent control of braking force for every driving wheel (for example, see Japanese Patent Application Laid-Open No. 203863/87).

In a vehicle having left and right front wheels serving as driving wheels, the following cases can be conceived even when an average speed $V_{DA}$ between both driving-wheel speeds $V_{DL}$ and $V_{DR}$ is substantially equal for the following cases: a case wherein both the driving wheels are in slipping tendencies with both of a left driving-wheel speed $V_{DL}$ and a right driving-wheel speed $V_{DR}$ being deviated from a vehicle speed $V_R$, as shown in FIG. 6; and a Case wherein one of the driving wheels, e.g., the right driving-wheel, is in a slipping tendency, with its speed $V_{DR}$ being largely deviated from the vehicle speed $V_R$, while the other driving wheel, e.g., the left driving wheel, is not in a slipping tendency, with its speed $V_{DL}$ being a value closer to a vehicle speed $V_R$, as shown in FIG. 7. In a method in which the excessive slipping states of the driving wheels are determined by taking into account, as at least one of judgment requirements, whether or not the driving-wheel speeds $V_{DL}$ and $V_{DR}$ exceed the target wheel speed $V_{RB}$, based on the judgement the braking forces for the driving wheels are independently controlled, as in the above described prior art, the braking force for the right driving wheel may be increased on the basis that the right driving-wheel speed $V_{DR}$ largely exceeds the target wheel speed $V_{RB}$, even though the average speed $V_{DA}$ has not been decreased. This results in a possibility of an excessive control of braking force.

In addition, in a traction control method in which an independent control of braking force for every driving wheel and a control of torque applied to the driving wheels in accordance with the result of judgment of the excessively slipping states on the basis of an average value between left and right driving-wheel speeds are combined, it is generally known to carry out the control of torque to the driving wheels by taking into account, as at least one judgment requirement, whether or not the average driving-wheel speed $V_{DA}$ exceeds the target wheel speed $V_{RT}$ which is set lower than the target wheel speed $V_{BR}$ for of the control of braking force, as shown in FIGS. 6 and 7. In this case, the control of braking and the control of torque are conducted in a balanced manner in the condition shown in FIG. 6, whereas in the condition shown in FIG. 7, the change of control of applied torque is reduced because the average driving-wheel speed $V_{DA}$ is reduced, as shown in FIG. 8, by an increase in braking force for the right driving wheel. In an extreme case, traction control is carried out only by the control of braking force, where the control of torque application is lost, resulting in an excessive control of braking force.

SUMMARY OF THE INVENTION

Accordingly, it is an object of the present invention to provide a traction control method for a vehicle, wherein an excessive control of braking force is prevented when a small number of driving wheels are in a slipping condition.

To achieve the above object, according to the present invention, there is provided a traction control method for a vehicle, comprising the steps of: judging an excessive slipping state of a plurality of driving wheels by taking into account, as at least one judgment requirement, whether or not a driving-wheel speed exceeds a braking-force controlling target wheel speed determined by taking into account a predetermined slip rate of a vehicle speed, and controlling a braking force for the driving wheels in accordance with the result of this judgment, wherein the intensity of a slipping tendency for every one of the driving wheels is determined on the basis of a judgment value which is set larger than the vehicle speed and smaller than the braking-force controlling target wheel speed, and the smaller the number of the driving wheels determined to have a large slipping tendency, the more the braking-force controlling target wheel speed is increased. This prevents the occurrence of an excessive control of braking force, when the slipping tendency of only one or a minority of the driving wheels is large.

According to another aspect and feature of the present invention, there is provided a traction control method for a vehicle, comprising the steps of: judging an excessively slipping state of left and right driving wheels by taking into account, as a least one judgment requirement, whether or not an average value between left and right driving-wheel speeds exceeds an output torque controlling target wheel speed determined by taking into account a predetermined slip rate of a vehicle speed, controlling a torque applied to the driving wheels in accordance with the result of judgment, judging the excessively slipping state of the driving wheels by taking into account, as at least one judgment requirement, whether or not the driving-wheel speed exceeds a braking-force controlling target wheel speed determined at a value larger than the output torque controlling target wheel speed by taking account of a slip rate larger than the first-mentioned slip rate of the vehicle speed, and controlling the braking force for the driving wheels in accordance with the result of the latter judgment, wherein the intensity of a slipping tendency for every one of the left and right driving wheels is judged on the basis of a judgment value which is set larger than the vehicle speed and smaller than the output torque controlling target wheel speed and the braking-force controlling target wheel speed, and when only one of the left and right driving wheels is determined to have a large slipping tendency, a difference between the output torque controlling target wheel speed and the braking-force controlling target wheel speed is increased to a larger level as compared with that when both the left and right driving wheels are determined to have large slipping tendencies. This prevents an excessive control of braking force, when the slipping tendency of only one of the left and right driving wheels is large, thereby enabling a balance between control of the braking force and control of torque applied to the driving wheels.

The above and other objects, features and advantages of the invention will become apparent from a consideration of the following description of the preferred embodiments, taken in conjunction with the accompanying drawings.

BRIEF DESCRIPTION OF THE DRAWINGS

FIGS. 1 to 3 illustrate a first embodiment of the present invention, wherein:

FIG. 1 is a block diagram of a control circuit;

FIG. 2 is a graph illustrating a relationship between the target wheel speed, the judgment value and the vehicle speed;

FIG. 3 is a graph of characteristics when the slipping tendency of one of left and right driving wheels is large;

FIG. 8 is a graph for explaining a problem arising when the slipping tendency of only one of the left and right driving wheels is large.

DESCRIPTION OF THE PREFERRED EMBODIMENTS

The present invention will now be described by way of preferred embodiments in connection with the accompanying drawings.

Figure 1:
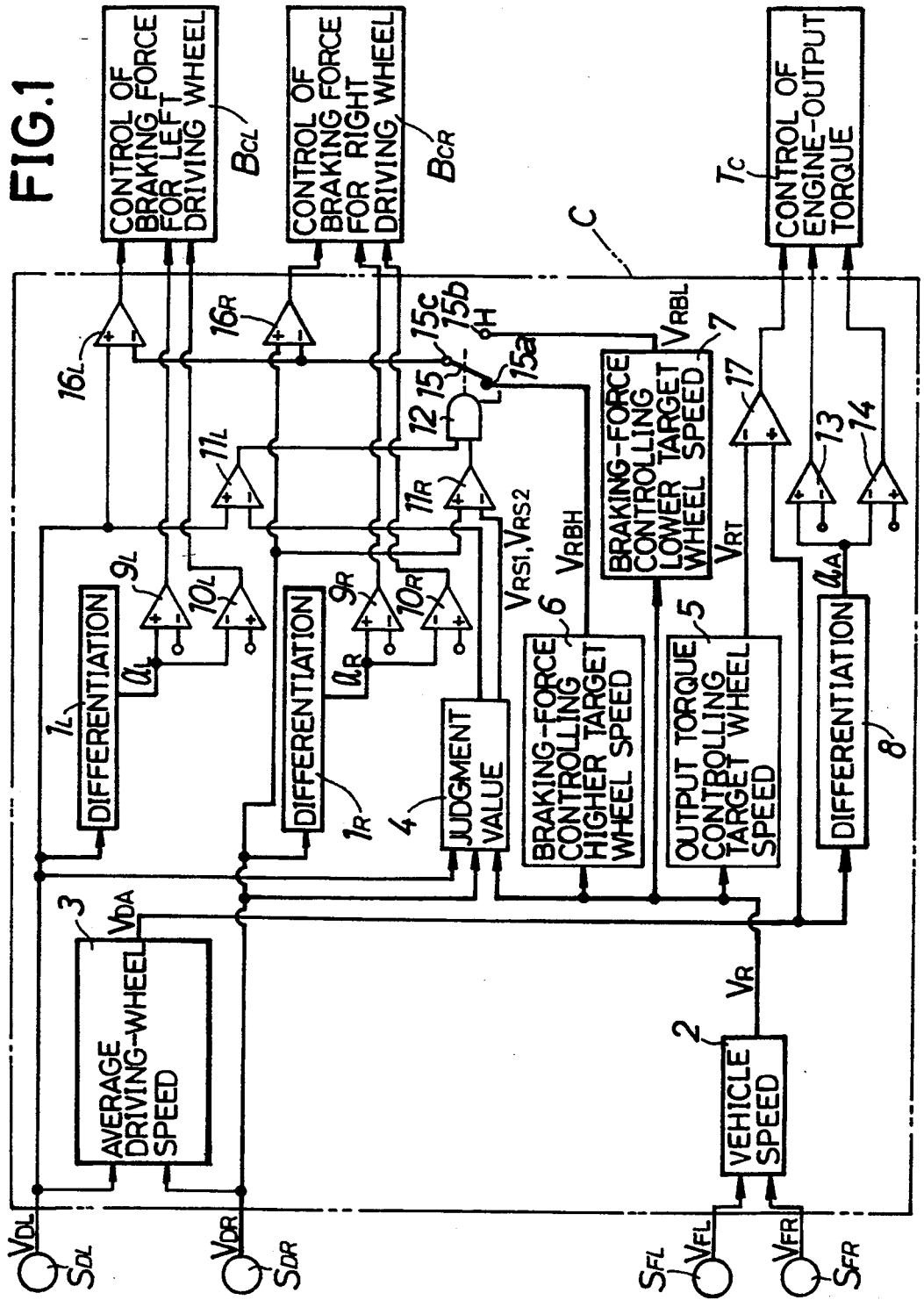

Referring first to FIG. 1, for example, in a vehicle of which left and right front wheels serve as driving wheels, a left driving-wheel speed sensor $S_{DL}$ and a right driving-wheel speed sensor $S_{DR}$ are associated with the left and right front wheels, respectively, and a left follower wheel speed sensor $S_{FL}$ and a right follower wheel speed sensor $S_{FR}$ are associated with left and right rear wheels which are follower wheels, respectively.

In order to prevent the left and right driving wheels from entering excessive slipping states, a left driving-wheel braking force control section $B_{CL}$ for controlling the braking force of a brake device mounted on the left driving wheel, and a right driving-wheel braking force control section $B_{CR}$ for controlling the braking force of a brake device mounted on the right driving wheel, as well as an engine output torque control section Tc for controlling, for example, the throttle opening degree to control torque applied from an engine mounted in the vehicle to the left and right driving wheels, are controlled by signals from control means C, which provides a control signal to each of the control sections on the basis of input signals from the sensors $S_{DL}$, $S_{DR}$, $S_{FL}$ and $S_{FR}$.

The control means C comprises differentiating circuits $1_L$ and $1_R$ for differentiating a left driving-wheel speed $V_{DL}$ detected by the left driving-wheel speed sensor $S_{DL}$ and a right driving-wheel speed $V_{DR}$ detected by the right driving-wheel speed sensor $S_{DR}$ to provide acceleration or deceleration values, $\alpha_L$ and $\alpha_R$, of the left and right driving wheels, respectively; a vehicle speed calculating circuit 2 for providing a vehicle speed $V_R$ on the basis of a left follower-wheel speed $V_{FL}$ detected by the left follower-wheel speed sensor $S_{FL}$ and a right follower-wheel speed $V_{FR}$ detected by the right follower-wheel speed sensor $S_{FR}$; an average driving-wheel speed calculating circuit 3 for averaging the left and right driving-wheel speeds $V_{DL}$ and $V_{DR}$ to provide an average driving-wheel speed $V_{DA}$; a judgment value calculating circuit 4 for providing first and second judgment values $V_{RS1}$ and $V_{RS2}$ on the basis of the vehicle speed $V_R$ for judging the intensity of a slipping tendency of the driving wheels; an output torque-controlling target wheel speed calculating circuit 5 for providing an output torque-controlling target wheel speed $V_{RT}$ on the basis of the vehicle speed $V_R$, a braking-force controlling higher target wheel speed calculating circuit 6 for providing a braking-force controlling higher target wheel speed $V_{RBH}$ on the basis of the vehicle speed $V_R$, and a braking-force controlling lower target wheel speed calculating circuit 7 for providing a braking-force controlling lower target wheel speed $V_{RBL}$ on the basis of the vehicle speed $V_R$. The control means C further includes a differentiating circuit 8 for differentiating the average driving-wheel speed $V_{DA}$ to provide an average acceleration or deceleration $\alpha_A$ of the driving wheels, comparators $9_L$ and $9_R$ for comparing the accelerations or decelerations $\alpha_L$ and $\alpha_R$ of the left and right driving wheels with a given acceleration to determine whether or not the left and right driving wheels are being accelerated, comparators $10_L$ and $10_R$ for comparing the accelerations or decelerations $\alpha_L$ and $\alpha_R$ of the left and right driving wheels with a given deceleration to determine whether or not the left and right driving wheels are being decelerated, comparators $11_L$ and $11_R$ for comparing the left and right driving-wheel speeds $V_{DL}$ and $V_{DR}$ with the first and second judgment values $V_{RS1}$ and $V_{RS2}$ respectively to separately determine the intensity of a slipping tendency of the left and right driving wheels, and an AND gate 12 which receives output signals from the comparators $11_L$ and $11_R$ to determine the number of the left and right driving wheels having a large slipping tendency. Control means C further includes a comparator 13 for comparing the average acceleration or deceleration $\alpha_A$ of the driving wheels with a given acceleration to determine whether or not both the driving wheels are being accelerated, a comparator 14 for comparing the average acceleration or deceleration $\alpha_A$ of the driving wheels with a given deceleration to determine whether or not both driving wheels are being decelerated, a switch circuit 15 for changing the switched states from one to another in response to an output from the AND gate 12, comparators $16_L$ and $16_R$ for comparing the left and right driving-wheel speeds $V_{DL}$, $V_{DR}$ with one of the braking-force controlling higher target wheel speed $V_{RBH}$ and the braking-force controlling lower target, wheel speed $V_{RBL}$, respectively, and a comparator 17 for comparing the average driving-wheel speed $V_{DA}$ and the output torque controlling target wheel speed $V_{RT}$.

In control means C, output signals from the comparators $9_L$, $10_L$ and $16_L$ are applied as control signals to the left driving-wheel braking force control section $B_{CL}$; output signals from the comparators $9_R$, $10_R$ and $16_R$ are applied as control signals to the right driving-wheel braking force control section $B_{CR}$; and output signals from the comparators 13, 14 and 17 are applied as control signals to the engine output torque control section Tc. In the left and right driving-wheel braking force control sections $B_{CL}$ and $B_{CR}$, the increasing, maintaining and decreasing of the braking force for the left and right driving wheels is controlled in a switching manner in accordance with whether or not the driving-wheel speeds $V_{DL}$ and $V_{DR}$ exceed the braking-force controlling higher or lower target wheel speed $V_{RBH}$ or $V_{RBL}$, as well as in accordance with whether each of the driving wheels is being accelerated or decelerated. In the engine-output torque control section Tc, the throttle opening degree is controlled to switchover the decreasing, maintaining and increasing of the engine-output torque in accordance with whether or not the average driving-wheel speed $V_{DA}$ exceeds the output torque controlling target wheel speed $V_{RT}$, as well as in accordance with the acceleration or deceleration $\alpha A$ calculated on the basis of the average driving-wheel speed $V_{DA}$.

Figure 2:
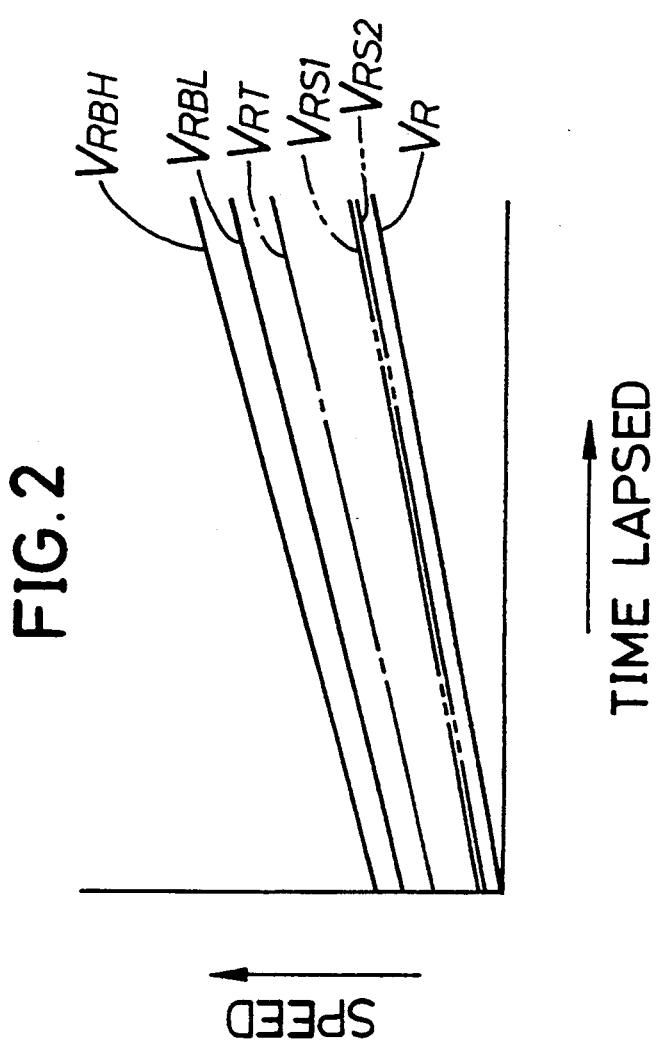

In the judgment value calculating circuit 4, a predetermined speed, e.g., a speed value on the order of 3 km/hr, is added to the vehicle speed $V_R$ received from the vehicle speed calculating circuit 2, thereby providing a first judgment value $V_{RS1}$ and a second judgment value $V_{RS2}$, slightly smaller than the first judgment value $V_{RS1}$, as shown in FIG. 2. Moreover, an output from the judgment value calculating circuit 4 is separately inputted into the comparators $11_L$ and $11_R$. When the driving-wheel speeds $V_{DL}$ and $V_{DR}$ are increased, the first judgment value $V_{RS1}$ is inputted into the comparators $11_L$ and $11_R$, and when the driving-wheel speeds $V_{DL}$ and $V_{DR}$ are decreased, the second judgment value $V_{RS2}$ is inputted into the comparators $11_L$ and $11_R$. Thus, when the driving-wheel speeds $V_{DL}$ and $V_{DR}$ are increased, the comparators $11_L$ and $11_R$ output a high level signal on the basis of the decision that the driving wheels have a large slipping tendency, in response to the driving-wheel speeds $V_{DL}$ and $V_{DR}$ exceeding the first judgment value $V_{RS1}$, and when the driving-wheel speeds $V_{DL}$ and $V_{DR}$ are decreased, the comparators $11_L$ and $11_R$ still output the high level signal on the basis of the decision that the driving wheels have a large slipping tendency until the driving-wheel speeds $V_{DL}$ and $V_{DR}$ become less than the second judgement value $V_{RS2}$, which is lower than the first judgment value $V_{RS1}$. The reason why the judgment has a hysteresis characteristic in this manner is to prevent the occurrence of chattering in judging the intensity of the slipping tendency.

In the braking-force controlling higher target wheel speed calculating circuit 6, the braking-force controlling higher target wheel speed $V_{RBH}$ is calculated, as shown in FIG. 2, based on the vehicle speed $V_R$ received into the circuit 6 while taking into account a predetermined slip rate. In the braking-force controlling lower target wheel speed calculating circuit 7, the braking-force controlling lower target wheel speed $V_{RBL}$ is calculated, as shown in FIG. 2, based on the vehicle speed $V_R$ received into the circuit 7 while taking into account a slip rate lower than the above-described predetermined slip rate. Further, in the output torque controlling target wheel speed calculating circuit 5, the output torque controlling target wheel speed $V_{RT}$ lower than the target wheel speeds $V_{RBH}$ and $V_{RBL}$ and higher than the first and second judgment values $V_{RS1}$ and $V_{RS2}$ is calculated based on the vehicle speed $V_R$ received into the circuit 5 while taking into account a slip rate further lower than the above-described slip rates.

In the switch circuit 15, the modes of connection of a separate contact 15a connected to the braking-force controlling higher target wheel speed calculating circuit 6 and a separate contact 15b connected to the braking-force controlling lower target wheel speed calculating circuit 7 with a common contact 15c connected to the comparators $16_L$ and $16_R$ are switched over from one to another in response to an output from the AND gate 12. More specifically, when the output from the AND gate 12 is a low level, i.e., when only one of the comparators $11_L$ and $11_R$ outputs a high level signal on the basis the decision that the output from the AND gate 12 is a low level, i.e., the slipping tendency is increased in only one of the left and right driving wheels, as well as when both the comparators $11_L$ and $11_R$ output low level signals on the basis of a decision that both the slipping tendencies of the left and right driving wheels are small, the switch circuit 15 is shifted to a switch mode in which the separate contact 15a is electrically connected to the common contact 15c, thereby permitting the braking-force controlling higher target wheel speed $V_{RBH}$ to be inputted into the comparators $16_L$ and $16_R$. When the output from the AND gate 12 is a high level, i.e., when both the comparators $11_L$ and $11_R$ output high level signals on the basis of decision that both the slipping tendencies of both the left and right driving wheels are large, the switch circuit 15 is shifted to a switch mode in which the separate contact 15b is electrically connected to the common contact 15c, thereby permitting the braking-force controlling lower target wheel speed $V_{RBL}$ to be inputted into the comparators $16_L$ and $16_R$.

Figure 6:
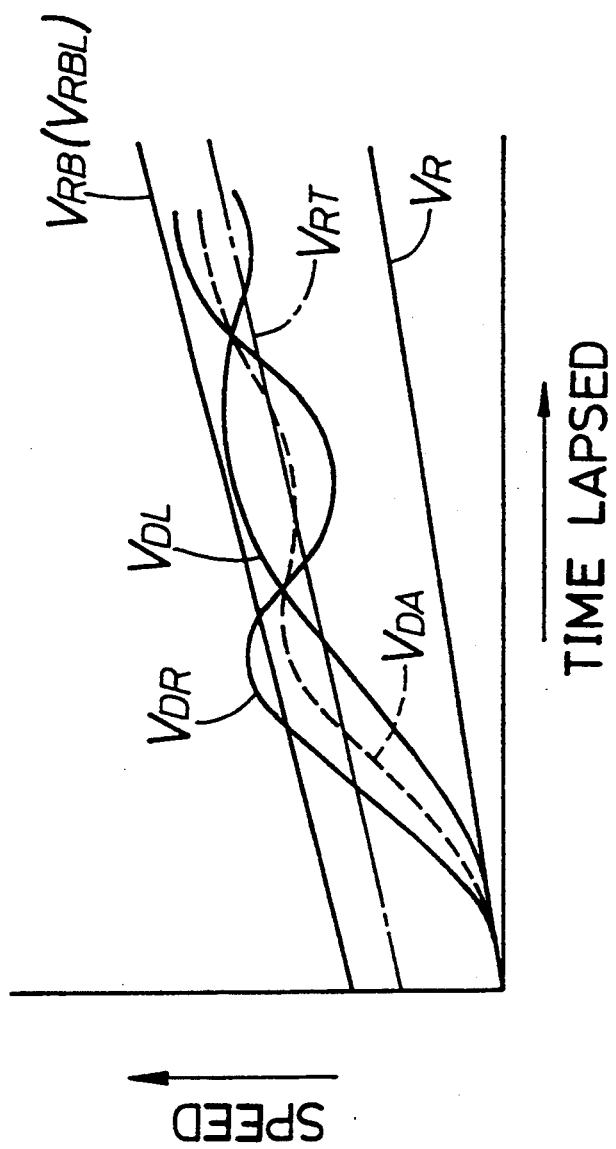
FIG. 6 is a graph of characteristics illustrating a condition when the slipping tendencies of left and right driving wheels are large.
Figure 7:
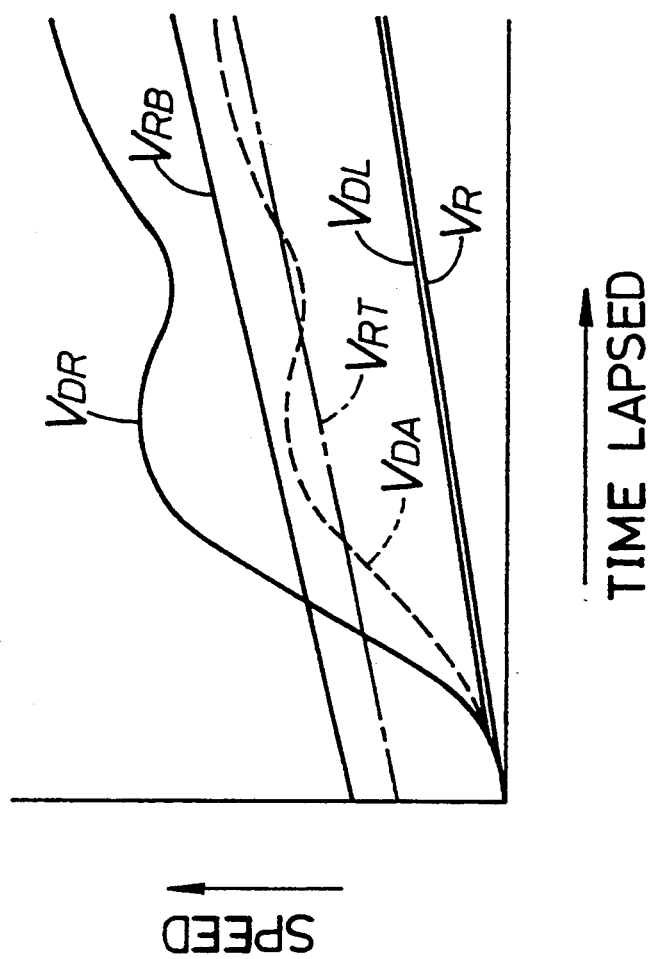
FIG. 7 is a graph of characteristics illustrating a condition when the slipping tendency of only one of the left and right driving wheels is large.

The operation of this embodiment will be described below. When determination is made in the AND gate 12 that the slipping tendencies of both the left and right driving wheels are large, the braking-force controlling lower target wheel speed $V_{RBL}$ is supplied to the comparators $16_L$ and $16_R$, and is determined as a target wheel speed $V_{RBL}$, as in the description with reference to FIG. 6, and the control of braking force and the control of applied torque are well balanced.

Figure 3:
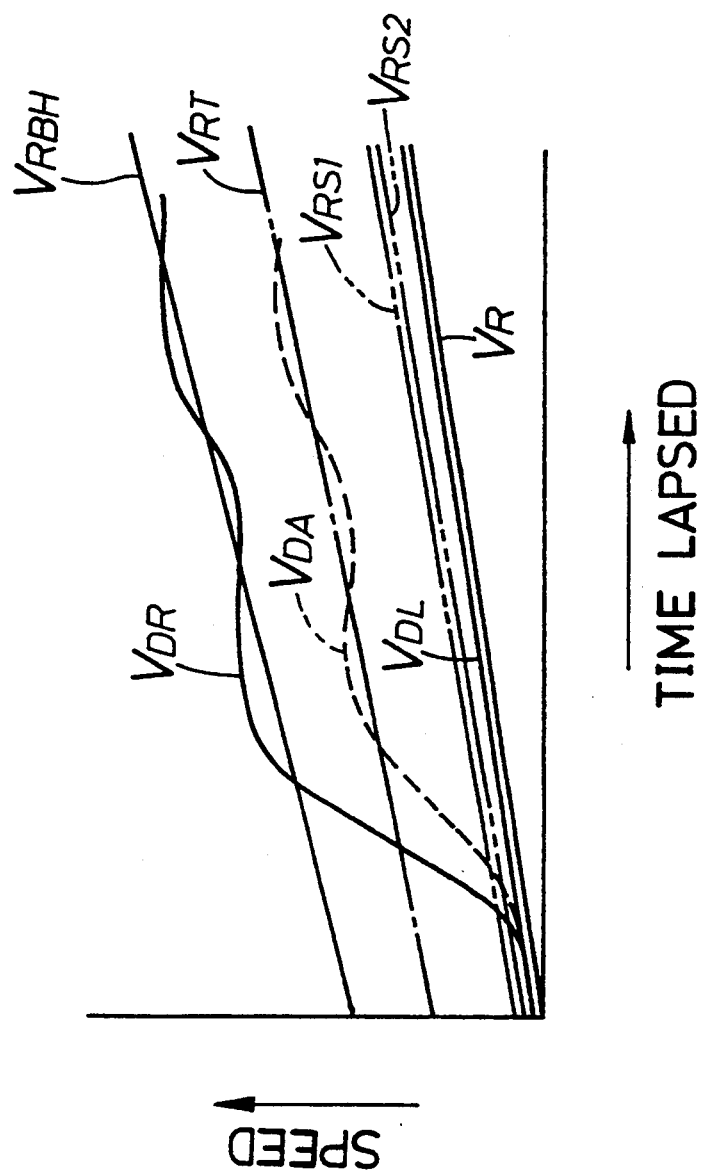

When determination is made in the AND gate 12 that the slipping tendency of only one of the left and right driving wheels, e.g., of the right driving wheel, is large, the braking-force controlling higher target wheel speed $V_{RBH}$ is supplied to the comparators $16_L$ and $16_R$ through the switch circuit 15. For this reason, the control of braking force for the right driving wheel can be carried out, while avoiding a dropping of the average driving-wheel speed $V_{DA}$, as shown in FIG. 8, by taking into account whether or not the right (for instance) driving-wheel speed $V_{DR}$ exceeds the relatively high target wheel speed $V_{RBH}$, as shown in FIG. 3, as at least one judgment requirement for the control of braking force. This ensures that any reduction in the change of controlling engine-output torque can be avoided, and the control of braking force and the control of torque applied to the driving wheels can be well-balanced, thereby preventing an excessive control of braking force.

Moreover, the first and second judgment values $V_{RS1}$ and $V_{RS2}$ are determined as values closer to the vehicle speed $V_R$ for judging the intensity of the slipping tendencies of the driving wheels, and the intensity of the slipping tendency is previously judged before the driving-wheel speeds $V_{DL}$ and $V_{DR}$ exceed the braking-force controlling target values $V_{RBL}$ and $V_{RBH}$. Therefore, the change-over of the target wheel speeds from one to another can be reliably carried out prior to a traction control.

In the above-described embodiment, when the slipping tendency of only either one of the left and right driving wheels is large, the higher one, $V_{RBH}$, of the braking-force controlling higher and lower target wheel speeds $V_{RBH}$ and $V_{RBL}$ is selected. Alternatively, when the traction control is carried out as a combination of the control of braking force for the driving wheels and the control of torque applied to the driving wheels, the output torque controlling target wheel speed $V_{RT}$ may be reduced. When determination is made that the slipping tendency of only either one of the left and right driving wheels is large, a difference between the braking-force controlling higher target wheel value $V_{RBH}$ and the output torque controlling target wheel speed $V_{RT}$ may be increased.

Figure 4:
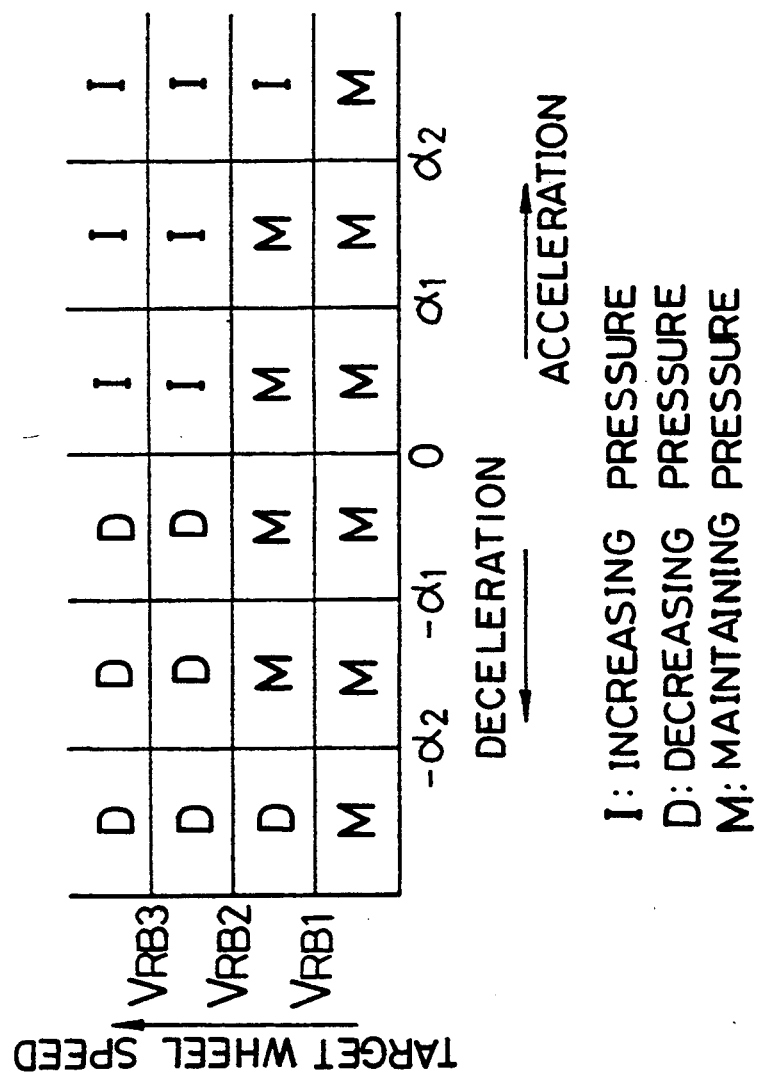
FIG. 4 is a diagram illustrating a control map established on the basis of a relationship between the target wheel speed and the driving-wheel acceleration and deceleration in a second embodiment of the present invention.

In a second embodiment of the present invention, a map in which the braking-force controlling target wheel speeds are divided in detail in accordance with accelerations and decelerations of the driving wheels may be previously set in accordance with a case wherein the slipping tendencies of the left and right driving wheels are large and with a case wherein the slipping tendency of only one of the left and right driving-wheels is large, as shown in FIG. 4.

More specifically, in FIG. 4, three control modes of increasing, maintaining and decreasing the braking pressure, in accordance with accelerations $\alpha_1$ and $\alpha_2$ ($\alpha_1 < \alpha_2$), decelerations $-\alpha_a$ and $-\alpha_1$ ($-\alpha_1 < \alpha_2$) and target wheel speeds $V_{RB1}$, $V_{RB2}$ and $V_{RB3}$ ($V_{RB1} < V_{RB2} < V_{RB3}$) are set in the map, enabling the control of braking force more precisely.

Figure 5:
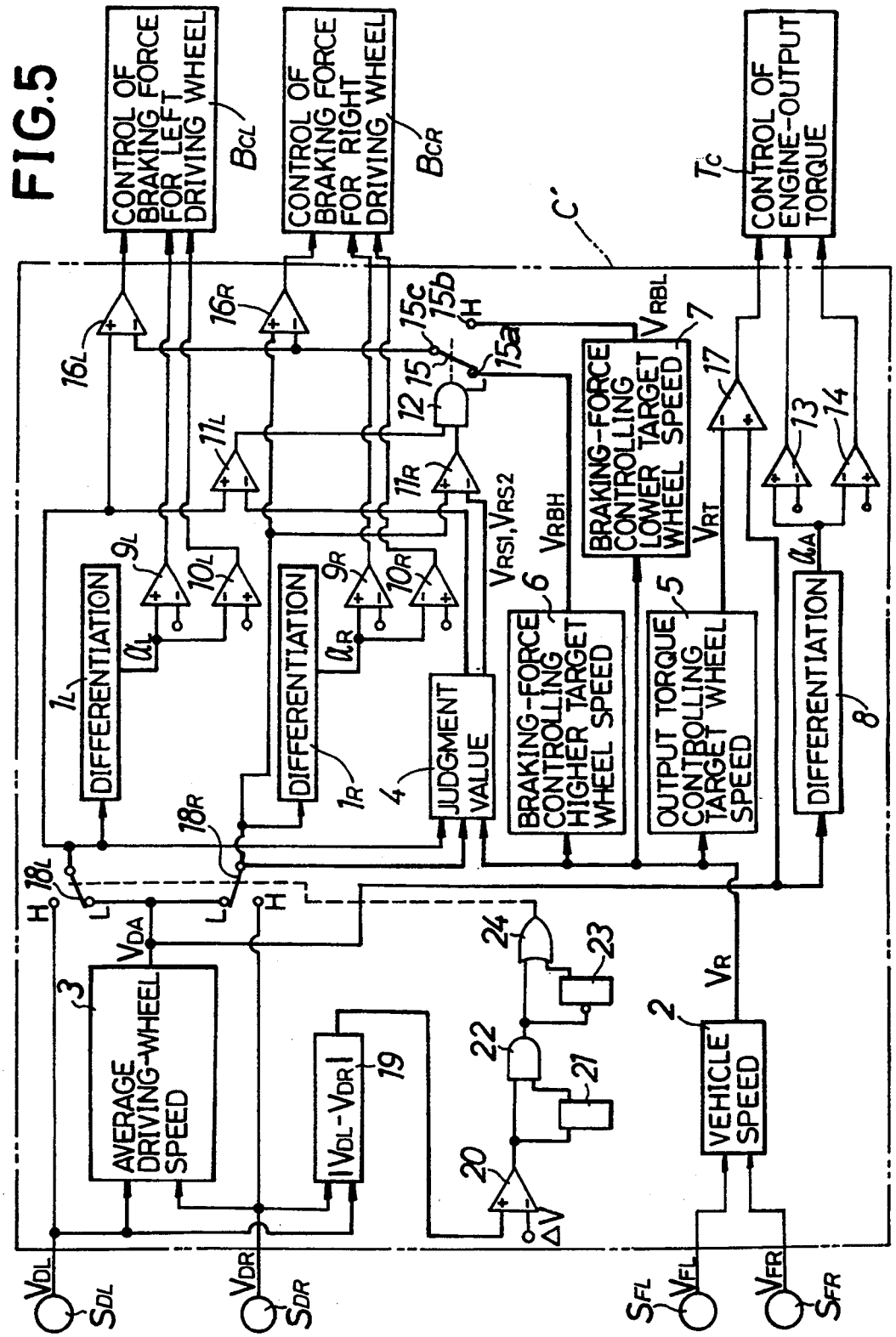
FIG. 5 is a block diagram of a control circuit, similar to FIG. 1, according to a third embodiment of the present invention.

FIG. 5 illustrates a third embodiment of the present invention, wherein parts or components corresponding to those in the first embodiment are designated by like reference characters.

Control means C' is switchable between an independent control mode capable of independently controlling the braking forces for the left and right driving wheels and a collective control mode capable of collectively controlling the braking forces for the left and right driving wheels. In the control means C', when the absolute value $|V_{DL}-V_{DR}|$ of a difference between a left driving-wheel speed $V_{DL}$ and a right driving-wheel speed $V_{DR}$ exceeds a predetermined set value $\Delta V$, the independent control mode is selected.

In addition to the construction of the control means C shown in FIG. 1, the control means C' further includes a switch control circuit $18_L$ adapted to select either one of the average driving-wheel speed $V_{DA}$ obtained in the average driving-wheel speed calculating circuit 3 and the left driving-wheel speed $V_{DL}$ obtained in the left driving-wheel speed sensor $S_{DL}$ to supply it to the differentiating circuit $1_L$, the judgment value calculating circuit 4 and the comparator $16_L$; a switch circuit $18_R$ adapted to select either one of the average driving-wheel speed $V_{DA}$ and the right driving-wheel speed $V_{DR}$ obtained in the right driving-wheel speed sensor $S_{DR}$ to supply it to the differentiating circuit $1_R$, the judgment value calculating circuit 4 and the comparator $16_R$; a speed difference absolute value calculating circuit 19 for calculating the absolute value $|V_{DL}-V_{DR}|$ of the difference between the left driving-wheel speed $V_{DL}$ and the right driving-wheel speed $V_{DR}$; a comparator 20 for comparing the absolute value $|V_{DL}-V_{DR}|$ with the predetermined set value $\Delta V$; an on-delay timer 21 adapted to output a high level signal with a delay of a predetermined time after the comparator 20 has delivered a high level signal; an AND gate 22 into which outputs from the comparator 20 and the on-delay timer 21 are inputted in parallel; an off-delay timer 23 adapted to deliver a low level signal with a delay of a predetermined time after the output from the AND gate 22 has become a low level; and an OR gate 24 into which outputs from the AND gate 22 and off-delay timer 23 are inputted in parallel. The switch modes of each of the switch circuits $18_L$ and $18_R$ are switched over from one to another in response to an output from the OR gate 24.

The comparator 20 outputs a high level signal when the absolute value $|V_{DL}-V_{DR}|$ of the difference in speeds has exceeded the predetermined value $\Delta V$. The predetermined value $\Delta V$ is set smaller than a value resulting from substraction of the larger one of the first and second judgment values $V_{RS1}$ and $V_{RS2}$ from the braking-force controlling target wheel speed provided when determination is made that the slipping tendencies of the left and right driving wheels are large, i.e., from the braking-force controlling lower target wheel speed $V_{RBL}$ selected in response to the high level signal outputted from the AND gate 12. The judgment value calculating circuit 4 adds a given value, e.g., 3 km/hr, to the vehicle speed $V_R$ to obtain a first judgment value $V_{RS1}$, and adds, for example, a given value slightly smaller than 3 km/hr to the vehicle Speed $V_R$ to obtain a second judgment value $V_{RS2}$, but the predetermined value $\Delta V$ is set larger than the given value, e.g, 3 km/hr, added to the vehicle speed $V_R$ to obtain the first judgment value $V_{RS1}$.

The OR gate 24 is intended to changeover the switch modes of the switch circuits $18_L$ and $18_R$, so that the left and right driving-wheel speeds $V_{DL}$ and $V_{DR}$ are selected when the output from the OR gate 24 is a high level, and the average driving-wheel speed $V_{DA}$ is selected when the output from the OR gate 24 is a low level.

Further, the combination of the on-delay timer 21, the AND gate 22, the off-delay timer 23 and the OR gate 24 ensures that the output from the OR gate 24 becomes the high level when the output of the high level signal from the comparator 20 is continued for a predetermined time or more, and the output from the OR gate 24 becomes the low level, when the output of the low level signal from the comparator 20 is continued for a predetermined time or more. Such a construction ensures that hunting can be prevented from occurring in the control change-over between the independent control mode and the collective control mode.

According to this embodiment, the following effects can be exhibited in addition to the effects in the first embodiment:

It can be reliably determined, on the basis of the absolute value $|V_{DL}-V_{DR}|$ of the difference between the left and right driving-wheel speeds $V_{DL}$ and $V_{DR}$, whether or not the vehicle is travelling on a road which has different friction coefficient at a road surface with which the left driving wheel is in contact and at a road surface with which the right driving wheel is in contact. During travel of the vehicle on a road with a large difference in friction coefficient between left and right road surfaces, the independent control mode can be selected to carry out a control while placing stress on a driving force by utilizing a differential braking effect between the left and right driving wheels. Whereas, during travelling of the vehicle on a road with a small difference between friction coefficients of left and right road surfaces, the collective control mode can be selected to improve driving comfort.

When in the collective mode, the intensity of the slipping tendency is judged by the average value between the left and right driving-wheel speeds $V_{DL}$ and $V_{DR}$, i.e., the average driving-wheel speed $V_{DA}$ obtained in the average driving-wheel speed calculating circuit 3. Therefore, even if there is a difference in phase between the left and right driving-wheel speeds $V_{DL}$ and $V_{DR}$ due to an interference with the left and right driving-wheels by a differential provided between the left and right driving wheels during travelling of the vehicle on a bad road, the selection of the braking-force controlling higher target wheel speed $V_{RBH}$ and the braking-force controlling lower target wheel speed $V_{RBL}$ in accordance with the number of driving wheels having a large slipping tendency need not be carried out unnecessarily, and the frequency of changeover between the target wheel speeds can be suppressed to smooth the control of braking force.

Moreover, in selecting the collective or independent control mode, if the predetermined value $\Delta V$ with which the absolute value $|V_{DL}-V_{DR}|$ of the difference between the left and right driving-wheel speeds $V_{DL}$ and $V_{DR}$ is to be compared is set smaller than a value resulting from substraction of the first judgment value $V_{RS1}$ from the braking-force controlling lower target wheel speed $V_{RBL}$, it is possible to avoid an interference between the control of changeover of the independent and collective control modes and the control of changeover of the braking-force controlling higher and lower target wheel speeds $V_{RBH}$ and $V_{RBL}$, in a condition in which determination is made that the slipping tendencies of the driving wheels is large during travelling of the vehicle on a road such as a snow-covered road which has less difference in friction coefficient between road surfaces with which both the left and right driving wheels are in contact, respectively.

More specifically, suppose that one of the left and right driving-wheel speeds $V_{DL}$ and $V_{DR}$ slightly exceeds the first judgment value $V_{RS1}$, and the other slightly exceeds the braking-force controlling lower target wheel speed $V_{RBL}$. If the predetermined value $\Delta V$ is set larger than the value resulting from the substraction of the first judgment value $V_{RS1}$ from the braking-force controlling lower target wheel speed $V_{RBL}$, the collective control mode may be selected in some cases. When the collective control mode is selected, if the braking force is applied to both the driving wheels to reduce both the driving-wheel speeds $V_{DL}$ and $V_{DR}$, and the above-described one driving-wheel speed becomes lower than the first judgment value $V_{RS1}$ based on the condition that the above-described other driving-wheel speed exceeds the braking-force controlling lower target wheel speed $V_{RBL}$, and if the above-described one driving-wheel speed becomes lower than the first judgement value $V_{RS1}$, the braking-force controlling higher target wheel speed $V_{RBH}$ is then selected. Thus, an increase in target value causes the application of the braking force to the driving wheels to be stopped, permitting both the driving-wheel speeds to be increased again, and as a result, the braking-force controlling lower target wheel speed $V_{RBL}$ is selected. In this way, when the predetermined value $\Delta V$ is set larger than the value resulting from substraction of the first judgment value $V_{RS1}$ from the braking-force controlling lower target wheel speed $V_{RBL}$, the target wheel speeds may be switched from one to another frequently, whereas when the predetermined value $\Delta V$ is set smaller than the value resulting from substraction of the first judgment value $V_{RS1}$ from the braking-force controlling lower target wheel speed $V_{RBL}$, even if one of the driving-wheel speeds $V_{DL}$ and $V_{DR}$ slightly exceeds the first judgment value $V_{RS1}$, and the other slightly exceeds the braking-force controlling lower target wheel speed $V_{RBL}$, the target wheel speeds are not frequently switched because of the independent control mode selected.

Further, since a value resulting from addition, to the vehicle speed $V_R$, of the given value smaller than the predetermined value $\Delta V$ as a criterion for selecting any one of the independent and collective control modes, is determined as the judgment value $V_{RS1}$, it is possible to determine a condition in which it is most remarkable that a suppression force by the control of braking force becomes excessive, i.e., a condition in which the friction coefficients of road surfaces with which the left and right driving wheels are in contact are largely different from each other, thereby enabling a proper changeover between the collective and independent control modes. More specifically, even if one of the driving wheel speeds is a value near the vehicle speed $V_R$, a situation in which the other driving-wheel speed is larger than the first judgment value $V_{RS1}$ can be reliably determined as a condition in which the friction coefficients of road surfaces on the left and right sides are largely different, and the collective and independent control modes can be properly changed over from one to another.

In the above-described embodiment, the traction control comprising the combination of the control of torque applied to the driving wheels in accordance with the result of judgment of the excessively slipping state by the average value between the left and right driving-wheel speeds and the separate control of braking force for each of the driving wheels has been described. However, the present invention is also applicable to a method in which the excessively slipping state of the driving wheels is eliminated only by applying a braking force separately to each of the driving wheels. Even in this case, an excessive control of braking force can be prevented. The present invention is also applicable to a vehicle in which not only left and right front wheels but also left and right rear wheels are driving wheels.

Although the embodiments have been described in detail, it will be understood that the present invention is not limited to the above-described embodiments, and various minor modifications in design can be made without departing from the scope of the present invention defined in claims.

What is claimed:

1. A traction control method for a vehicle, comprising the steps of:
sensing a vehicle speed;
judging an excessive slipping state of a plurality of driving wheels by taking into account, as at least one judgment requirement, whether or not a driving-wheel speed exceeds a braking-force controlling target wheel speed determined by taking into account a predetermined slip rate and the vehicle speed; and
controlling a braking force for the driving wheels in accordance with the result of said judgment, wherein an excessive slipping tendency for every one of said driving wheels is determined to exist when the driving wheel speed exceeds a judgment value which is set larger than the vehicle speed and smaller than said braking-force controlling target wheel speed, and the smaller the number of said driving wheels determined to have a large slipping tendency, the more said braking-force controlling target wheel speed is increased.

2. A traction control method for a vehicle according to claim 1, wherein said plurality of driving wheels comprise left and right driving wheels, and wherein an independent control mode for independently controlling braking forces for said left and right driving wheels and a collective control mode for collectively controlling the braking forces for said left and right driving wheels are switchable from one to another, and said independent control mode is selected in response to an absolute value of a difference between left and right driving wheel speeds exceeding a predetermined value.

3. A traction control method for a vehicle according to claim 2, wherein a value resulting from subtraction of said judgment value from said braking-force controlling target wheel speed at a time when determination is made that the slipping tendencies of both said left and right driving wheels are determined to be excessive, is set larger than said predetermined value.

4. A traction control method for a vehicle according to claim 3, wherein a value resulting from addition of a given value smaller than said predetermined value to the vehicle speed is determined as said judgment value.

5. A traction control method for a vehicle according to claim 1, wherein said plurality of driving wheels comprise left and right driving wheels, and where an independent control mode for independently controlling braking forces for said left and right driving wheels and a collective control mode for collectively controlling the braking forces for the said left and right driving wheels are switchable over from one to another, and in said collective control mode, a judgment whether or not an average value between left and right driving wheel speeds exceeds said braking-force controlling target wheel speed is used as said judgment requirement, and an intensity of the slipping tendency is judged by comparing said judgment value with said average value between said left and right driving wheel speeds.

6. A traction control method for a vehicle according to claim 1, wherein a first judgment value and a second judgment value smaller than said first judgment value are previously determined in order to judge the intensity of the slipping tendency of the driving wheels, and a judgment of the slipping tendency of said driving wheels being excessive is made until the driving wheel speed falls equal or less than said second judgment value after exceeding said first judgment value.

7. A traction control method for a vehicle, comprising the steps of:
judging an excessive slipping state of left and right driving wheels by taking into account, as at least one judgment requirement, whether or not an average value between left and right driving-wheel speeds exceeds an output torque controlling target wheel speed determined by taking account of a predetermined first slip rate of and a vehicle speed;
controlling a torque applied to said driving wheels in accordance with the result of said judgment;
judging an excessive slipping state of said left and right driving wheels by taking into account, as at least one judgment requirement, whether or not one of said left and right driving-wheel speeds exceeds a braking-force controlling target wheel speed determined at a value larger than said output torque controlling target wheel speed by taking into account a second slip rate larger than said first slip rate and a vehicle speed; and
controlling the braking force for the driving wheels in accordance with the result of the latter judgment, wherein the intensity of a slipping tendency for every one of the left and right driving wheels is judged on the basis of a judgment value which is set larger than the vehicle speed and smaller than said output torque controlling target wheel speed and said braking-force controlling target wheel speed, and when only one of the left and right driving wheels is determined to have an excessive slipping tendency, a difference between said output torque controlling target wheel speed and said braking-force controlling target wheel speed is increased to a larger level as compared with that when both the left and right driving wheels are determined to have large slipping tendencies.

8. A traction control method for a vehicle having a plurality of driving wheels, comprising the steps of:
sensing a vehicle speed;
determining a braking-force controlling target wheel speed by adding a predetermined slip rate to said vehicle speed;
sensing a driving wheel speed for said driving wheels;
comparing said driving wheel speed to said braking-force controlling target wheel speed to determine an excessive slipping state for said driving wheels, wherein an excessive slipping tendency for each said driving wheel is determined to exist by comparing said driving wheel speed with a value which is set larger than said vehicle speed and smaller than said braking-force controlling target wheel speed;
increasing the braking-force controlling target wheel speed larger when the number of driving wheels determined to have an excessive slipping state decreases; and
controlling a braking force for each of said driving wheels according to whether said excessive slipping state is determined.

9. A traction control method as recited in claim 8, wherein the smaller the number of said driving wheels determined to have said excessive slipping tendency, the more said braking-force controlling target wheel speed is increased.

* * * * *